US012367098B2

(12) United States Patent
Rhee et al.

(10) Patent No.: US 12,367,098 B2
(45) Date of Patent: Jul. 22, 2025

(54) METHOD FOR MITIGATING ERROR OF QUANTUM CIRCUIT AND APPARATUS THEREOF

(71) Applicant: Korea Advanced Institute of Science and Technology, Daejeon (KR)

(72) Inventors: June-Koo Rhee, Daejeon (KR); Changjun Kim, Daejeon (KR); Kyungdeock Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 962 days.

(21) Appl. No.: 17/493,091

(22) Filed: Oct. 4, 2021

(65) Prior Publication Data

US 2022/0114047 A1 Apr. 14, 2022

(30) Foreign Application Priority Data

Oct. 8, 2020 (KR) .................. 10-2020-0130044
Dec. 15, 2020 (KR) .................. 10-2020-0175727
Mar. 3, 2021 (KR) .................. 10-2021-0027981

(51) Int. Cl.
*G06F 11/10* (2006.01)
*G06N 3/08* (2023.01)
*G06N 10/00* (2022.01)
*G06N 20/00* (2019.01)

(52) U.S. Cl.
CPC .......... *G06F 11/1008* (2013.01); *G06N 3/08* (2013.01); *G06N 10/00* (2019.01); *G06N 20/00* (2019.01)

(58) Field of Classification Search
None
See application file for complete search history.

(56) References Cited

U.S. PATENT DOCUMENTS

2017/0364362 A1 12/2017 Lidar et al.
2019/0044542 A1 2/2019 Hogaboam et al.

OTHER PUBLICATIONS

Niu, Murphy Yuezhen, Sergio Boixo, Vadim N. Smelyanskiy, and Hartmut Neven. "Universal quantum control through deep reinforcement learning." npj Quantum Information 5, No. 1 (2019): 33. (Year: 2019).*
Nautrup, Hendrik Poulsen, Nicolas Delfosse, Vedran Dunjko, Hans J. Briegel, and Nicolai Friis. "Optimizing quantum error correction codes with reinforcement learning." Quantum 3 (2019): 215. (Year: 2019).*
Office Action for EP 21201624.0 by European Patent Office dated Oct. 12, 2023.

(Continued)

*Primary Examiner* — Incent Gonzales
(74) *Attorney, Agent, or Firm* — BROADVIEW IP LAW, PC

(57) ABSTRACT

The present disclosure relates to a method for mitigating an error of a quantum circuit in a quantum computer, the method including: detecting a quantum circuit to be mitigated among a plurality of quantum circuits forming the quantum computer; invoking a pre-trained deep learning model for mitigating an error of the plurality of quantum circuits; inferring an error correction value of the detected quantum circuit using the invoked deep learning model; and mitigating an error of the detected quantum circuit based on the inferred error correction value.

15 Claims, 19 Drawing Sheets

(56) References Cited

OTHER PUBLICATIONS

Mrazova, Iveta et al. (2008). "Hybrid Convolutional Neural Networks", 6th IEEE International Conference on Industrial Informatics. pp. 469-474, doi: 10.1109/INDIN.2008.4618146.
Office Action for KR 10-2021-0027981 by Korean Intellectual Property Office dated Apr. 27, 2023.
Piotr Czarnik et al. Error mitigation with Clifford quantum-circuit data, Theoretical Division, Los Alamos National Laboratory, Los Alamos, NM 87545, USA., arXiv:2005.10189v1 [quant-ph] May 20, 2020.
European Search Report by European Patent Office for EP21201624 dated Feb. 22, 2022.

* cited by examiner

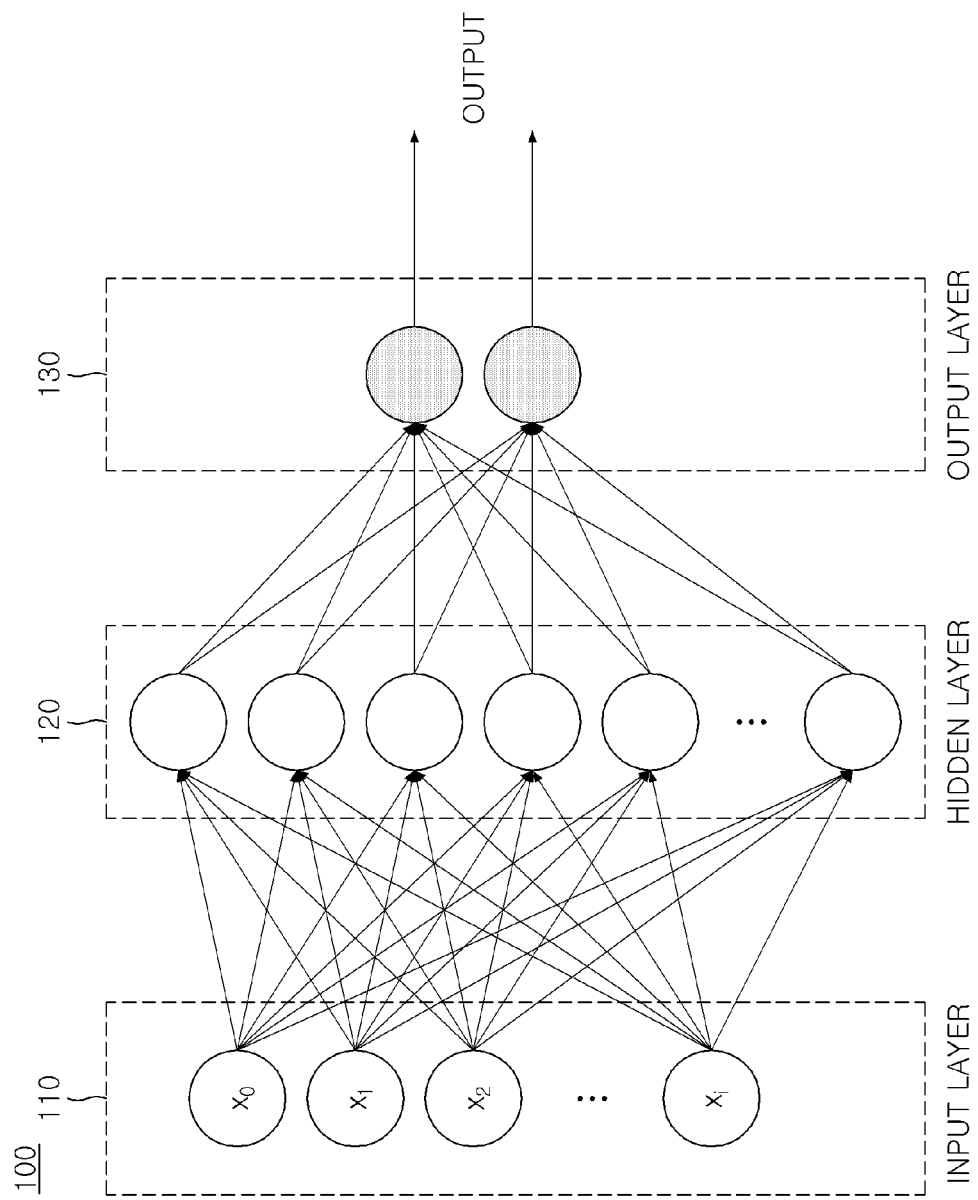

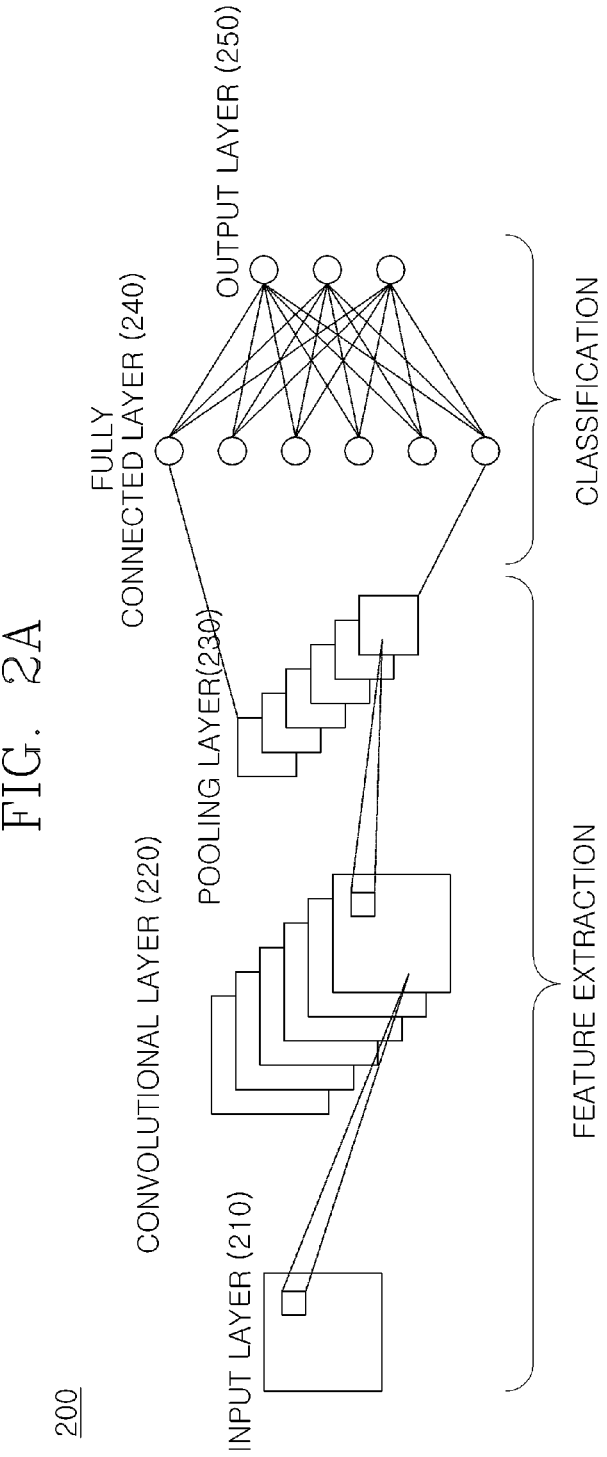

FIG. 3

| GATE | LOGIC SYMBOL | DETERMINANT |
|---|---|---|
| NOT | —[X]— | $\begin{bmatrix} 0 & 1 \\ 1 & 0 \end{bmatrix}$ |
| HADAMARD | —[H]— | $\frac{1}{\sqrt{2}} \begin{bmatrix} 1 & 1 \\ 1 & -1 \end{bmatrix}$ |
| PAULI-X | —[X]— | $\begin{bmatrix} 0 & 1 \\ 1 & 0 \end{bmatrix}$ |
| PAULI-Y | —[Y]— | $\begin{bmatrix} 0 & -i \\ i & 0 \end{bmatrix}$ |
| PAULI-Z | —[Z]— | $\begin{bmatrix} 1 & 0 \\ 0 & -1 \end{bmatrix}$ |
| PHASE | —[S]— | $\begin{bmatrix} 1 & 0 \\ 0 & i \end{bmatrix}$ |
| π/8 | —[T]— | $\begin{bmatrix} 1 & 0 \\ 0 & e^{j\pi/4} \end{bmatrix}$ |
| CNOT | —⊕— | $\begin{bmatrix} 1 & 0 & 0 & 0 \\ 0 & 1 & 0 & 0 \\ 0 & 0 & 0 & 1 \\ 0 & 0 & 1 & 0 \end{bmatrix}$ |
| Controlled Z (CZ) | | $\begin{bmatrix} 1 & 0 & 0 & 0 \\ 0 & 1 & 0 & 0 \\ 0 & 0 & 1 & 0 \\ 0 & 0 & 0 & -1 \end{bmatrix}$ |
| SWAP | —×— | $\begin{bmatrix} 1 & 0 & 0 & 0 \\ 0 & 0 & 1 & 0 \\ 0 & 1 & 0 & 0 \\ 0 & 0 & 0 & 1 \end{bmatrix}$ |

<QUANTUM GATE>

<QUANTUM CIRCUIT>

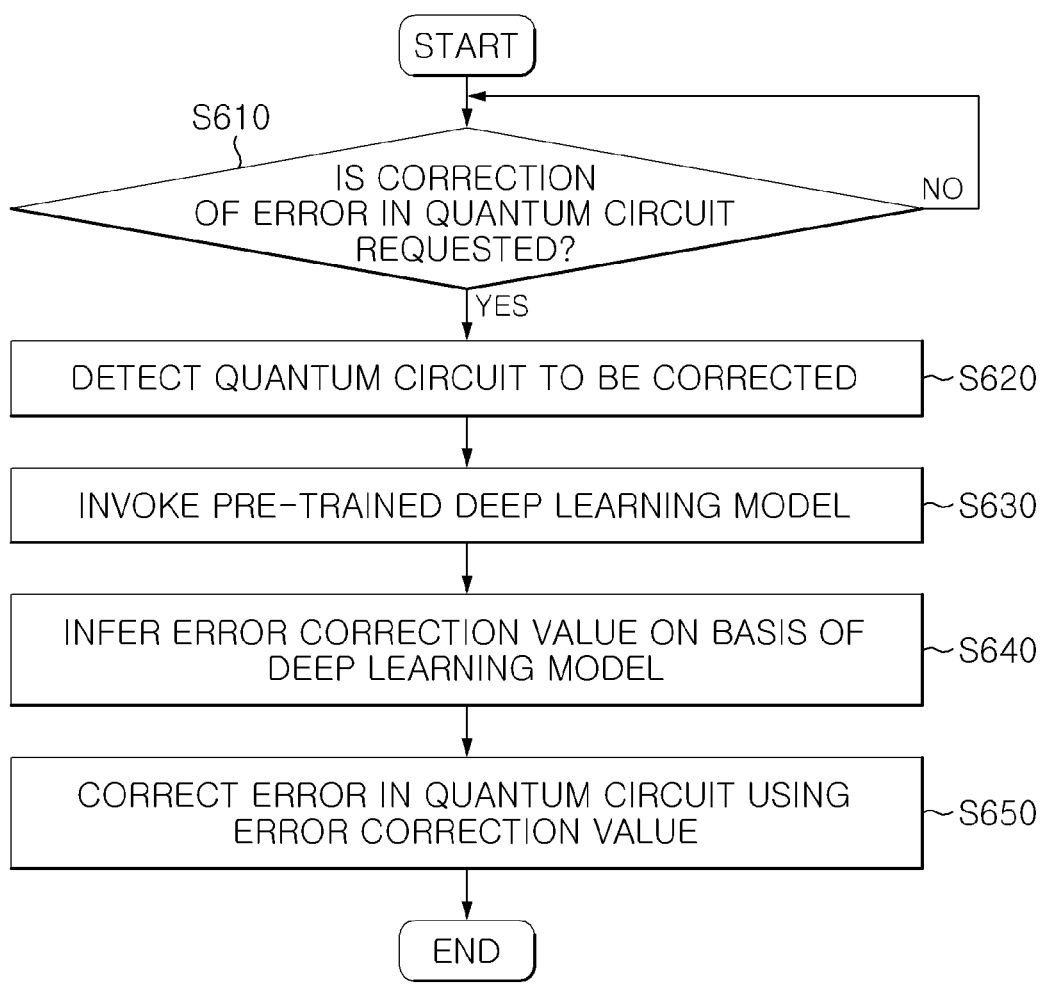

FIG. 10
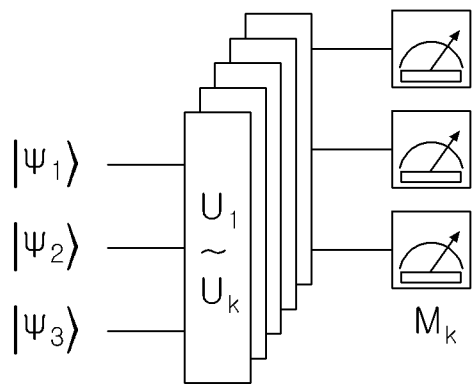
<QUANTUM CIRCUIT TO BE LEARNED>
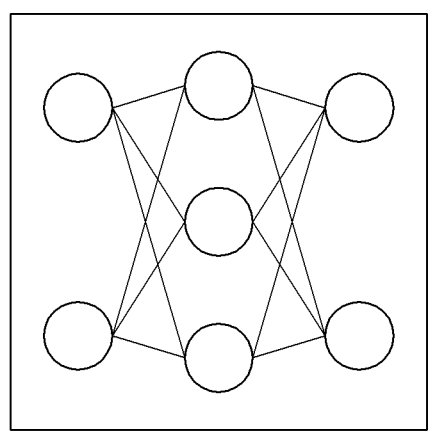
<TRAINING OF DNN MODEL TO MITIGATE
ERRORS IN QUANTUM CIRCUIT>

FIG. 11
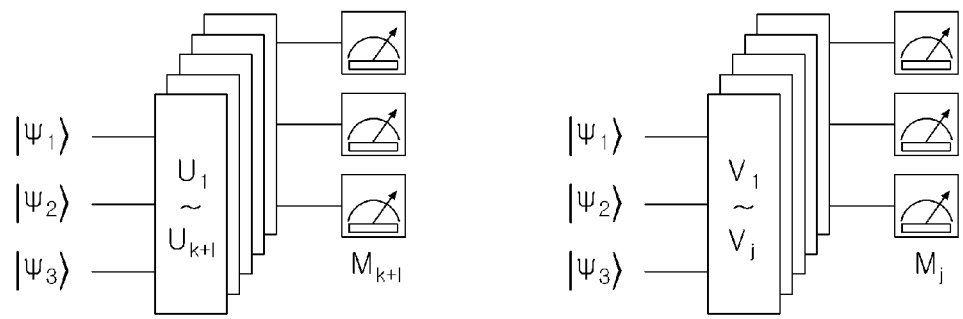
<QUANTUM CIRCUIT TO BE CORRECTED>
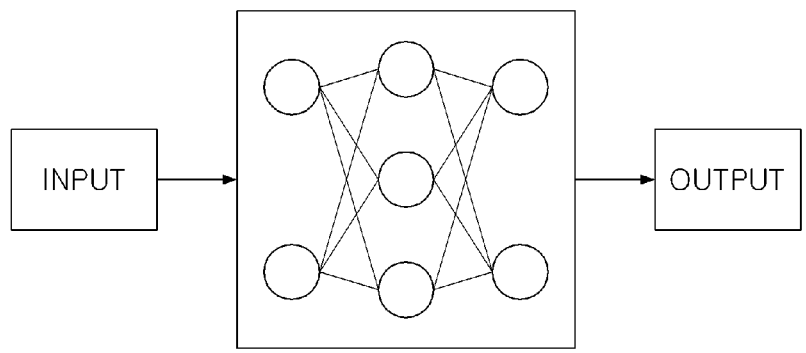
<INFERENCE OF ERROR CORRECTION
VALUE USING DNN MODEL>

FIG. 13
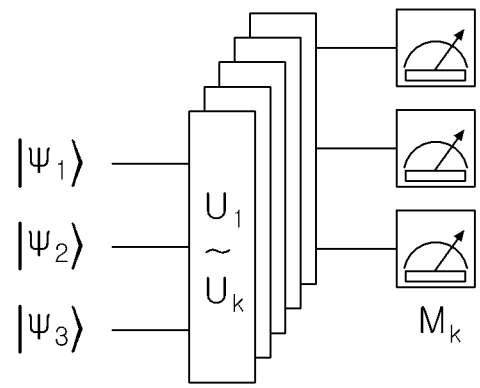
<QUANTUM CIRCUIT TO BE LEARNED>
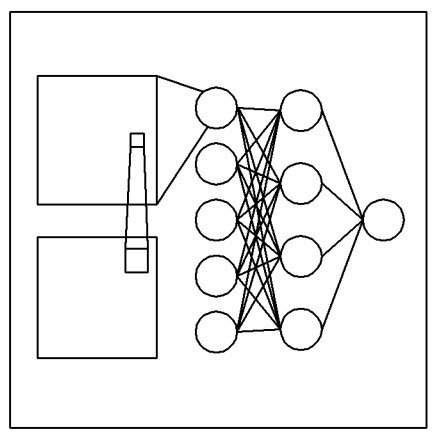
<TRAINING OF H-CNN MODEL TO MITIGATE
ERRORS IN QUANTUM CIRCUIT>

FIG. 14
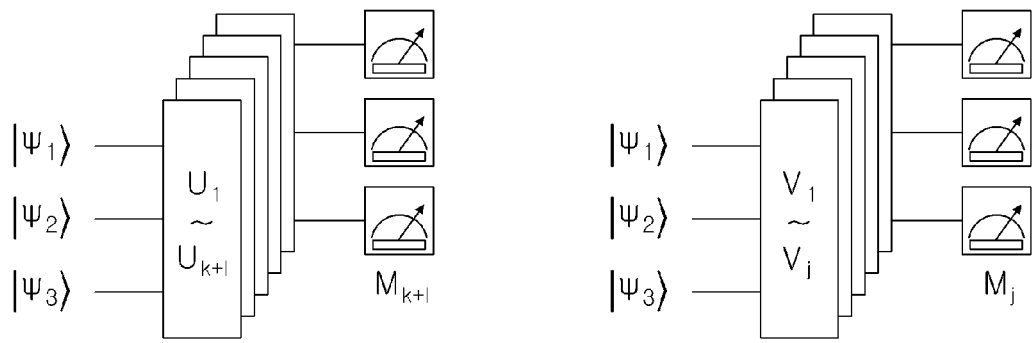
<QUANTUM CIRCUIT TO BE CORRECTED>
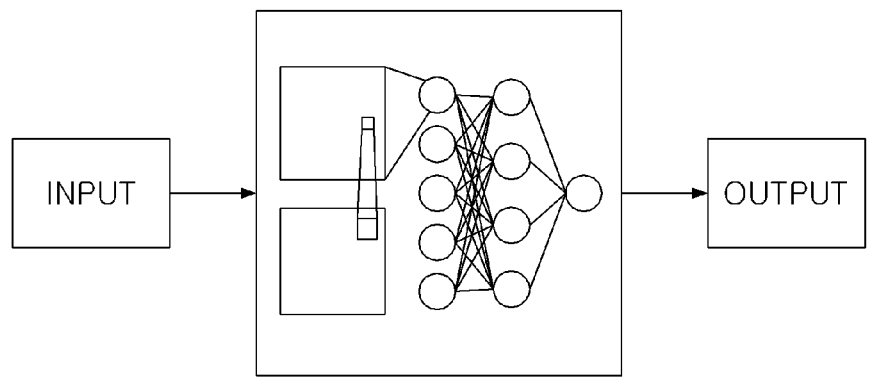
<INFERENCE OF ERROR CORRECTION
VALUE USING H-CNN MODEL>

METHOD FOR MITIGATING ERROR OF QUANTUM CIRCUIT AND APPARATUS THEREOF

CROSS-REFERENCE TO RELATED APPLICATIONS

This application claims priority to Korean Patent Application No. 10-2020-0130044 filed on Oct. 8, 2020, Korean Patent Application No. 10-2020-0175727 filed on Dec. 15, 2020, and Korean Patent Application No. 10-2021-0027981 filed on Mar. 3, 2021 in the Korean Intellectual Property Office, the entire contents of which are hereby incorporated by reference in their entirety.

BACKGROUND OF THE INVENTION

1. Field of the Invention

The present disclosure relates to quantum computing and, more particularly, to a method and an apparatus for mitigating errors in quantum circuits forming a quantum computer.

2. Description of the Prior Art

A quantum computer is a new concept of a computer that is capable of simultaneously processing a plurality of pieces of information using unique physical properties of quantum states, such as superposition and entanglement. As an alternative to overcome performance limitations of a classical computer due to current leakage occurring in a microcircuit of a modern semiconductor chip, a need for quantum computers is gradually increasing. A quantum computer can exponentially increase information processing and computing speeds through quantum parallel processing in quantum bits or qubits, which are quantum information units, as the basic unit of information processing, thereby quickly solving problems. Accordingly, a quantum computer is expected to bring huge innovations in various industries, such as finance, chemistry, and pharmaceuticals, due to strengths thereof in complex calculations and mass data processing, such as optimal route search, prime factorization, and mass data search.

Key element technologies forming a quantum computer include a qubit implementation technology, a quantum algorithm technology, a quantum error correction code (QECC) technology, and a quantum circuit technology. Among these element technologies, the quantum circuit technology includes a technology for implementing a quantum gate for information processing of a qubit, which is a quantum information unit, and a technology for eliminating an error existing in a quantum circuit. A representative example of the technology for eliminating the error existing in the quantum circuit is a quantum error correction (QEC) technology.

Generally, errors existing in a quantum circuit include errors according to the types of quantum gates forming the circuit and errors according to the combination order of quantum gates. That is, errors existing in a quantum circuit vary depending on not only the configuration of quantum gates but also the combination order of quantum gates. Therefore, a conventional QEC technology corrects an error existing in a quantum circuit in view of both the type of quantum gates forming the quantum circuit and the order thereof. However, this QEC technology requires a separate quantum circuit and involves a very complicate computation process for error correction, thus spending a considerable amount of time and energy in correcting an error existing in a quantum circuit.

SUMMARY OF THE INVENTION

An aspect of the present disclosure is to address the above-mentioned problems and other problems. Another aspect of the present disclosure is to provide a quantum circuit error mitigation method and an apparatus therefor capable of effectively mitigating errors existing in a quantum circuit using a pre-trained deep learning model.

In view of the foregoing, an embodiment of the present disclosure provides a method for mitigating an error of a quantum circuit in a quantum computer, the method including: detecting a quantum circuit to be mitigated among a plurality of quantum circuits forming the quantum computer; invoking a pre-trained deep learning model for mitigating an error of the plurality of quantum circuits; inferring an error correction value of the detected quantum circuit using the invoked deep learning model; and mitigating an error of the detected quantum circuit based on the inferred error correction value.

Another embodiment of the present disclosure provides an apparatus for mitigating an error of a quantum circuit, the apparatus including: a memory to store a pre-trained deep learning model for mitigating an error of a plurality of quantum circuits forming a quantum computer; and a processor to detect a quantum circuit to be mitigated among the plurality of quantum circuits, to infer an error correction value of the detected quantum circuit using the deep learning model stored in the memory, and to mitigate an error of the detected quantum circuit based on the inferred error correction value.

Still another embodiment of the present disclosure provides a computer program stored in a computer-readable recording medium to execute, on a computer, a process of detecting a quantum circuit to be mitigated among a plurality of quantum circuits forming the quantum computer, a process of invoking a pre-trained deep learning model for mitigating an error of the plurality of quantum circuits, a process of inferring an error correction value of the detected quantum circuit using the invoked deep learning model, and a process of mitigating an error of the detected quantum circuit based on the inferred error correction value.

BRIEF DESCRIPTION OF THE DRAWINGS

The above and other aspects, features and advantages of the present disclosure will be more apparent from the following detailed description taken in conjunction with the accompanying drawings, in which:

FIG. 1A illustrates the basic structure of a deep neural network (DNN) related to the present disclosure;

FIG. 2A illustrates the basic structure of a convolutional neural network (CNN) related to the present disclosure;

FIG. 3 illustrates types of quantum gates related to the present disclosure;

FIG. 6 is a flowchart illustrating a quantum circuit error correction method according to an exemplary embodiment of the present disclosure;

FIG. 10 illustrates a process of selecting a quantum circuit to be learned and training a DNN model based on the selected quantum circuit to be learned;

FIG. 11 illustrates the type of a quantum circuit to be corrected and a process of correcting an error in the quantum circuit to be corrected using a pre-trained DNN model;

FIG. 13 illustrates a process of selecting a quantum circuit to be learned and training an H-CNN model based on the selected quantum circuit to be learned;

FIG. 14 illustrates the type of a quantum circuit to be corrected and a process of correcting an error in the quantum circuit to be corrected using a pre-trained H-CNN model.

DETAILED DESCRIPTION OF THE EXEMPLARY EMBODIMENTS

Figure 1B:
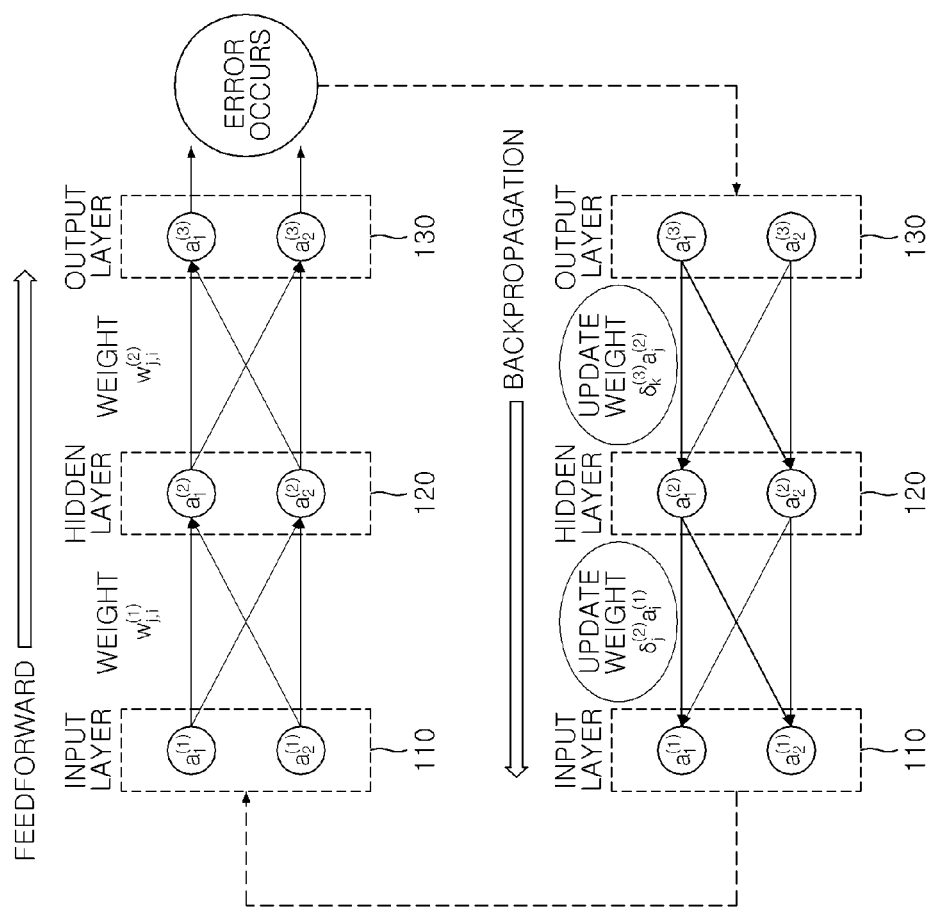
FIG. 1B illustrates a learning process of a deep neural network (DNN) related to the present disclosure.

Hereinafter, embodiments disclosed herein will be described in detail with reference to the accompanying drawings, in which like or similar elements are denoted by like reference numerals regardless of drawing numerals and redundant descriptions thereof will be omitted. As used herein, the terms "module" and "unit" for components are given or interchangeably used only for ease in writing the specification and do not themselves have distinct meanings or functions. That is, the term "unit" used herein refers to software or a hardware component, such as FPGA or ASIC, and a "unit" performs certain functions. However, a "unit" is not limited to software or hardware. A "unit" may be configured to be in an addressable storage medium or may be configured to play one or more processors. Thus, in one example, a "unit" includes components, such as software components, object-oriented software components, class components, and task components, processes, functions, properties, procedures, subroutines, segments of a program code, drivers, firmware, a microcode, circuitry, data, a database, data structures, tables, arrays, and variables. Functions provided in components and "units" may be combined into a smaller number of components and "units" or may be further divided into additional components and "units".

When detailed descriptions about related known technology are determined to make the gist of embodiments disclosed herein unclear in describing the embodiments disclosed herein, the detailed descriptions will be omitted herein. In addition, it should be understood that the accompanying drawings are only for easy understanding of the embodiments disclosed herein, and technical ideas disclosed herein are not limited by the accompanying drawings but include all modifications, equivalents, or substitutes included in the spirit and technical scope of the present disclosure.

The present disclosure proposes a quantum circuit error correction method and an apparatus therefor, which are capable of effectively correcting (or mitigating) errors existing in a quantum circuit using a pre-trained deep learning model. The deep learning model may be a deep neural network (DNN) or a hybrid convolutional neural network (H-CNN) but is not necessarily limited thereto.

Hereinafter, various embodiments of the present disclosure will be described in detail with reference to the drawings.

FIG. 1A illustrates the basic structure of a deep neural network (DNN) related to the present disclosure, and FIG. 1B illustrates a learning process of the deep neural network (DNN) illustrated in FIG. 1A.

Referring to FIG. 1A and FIG. 1B, a multilayer perceptron (MLP) 100 related to the present disclosure is the most basic structure of a deep neural network (DNN) and includes an input layer 110, a hidden layer 120, and an output layer 130.

The multilayer perceptron 100 is an artificial neural network structure proposed to overcome limitations of a single perceptron. That is, the multilayer perceptron 100 is an artificial neural network structure proposed to enable learning of even nonlinearly separated data, such as an exclusive-OR gate. To this end, the multilayer perceptron 100 has a structure that further includes one or more hidden layers 120, unlike a single perceptron.

The input layer 110 of the multilayer perceptron 100 refers to a layer in which an input vector corresponding to learning data is located, and the output layer 130 refers to a layer in which a final result value of the learning model is located. The hidden layer 120 refers to any layer existing between the input layer 110 and the output layer 130. As the number of hidden layers 120 increases, an artificial neural network is referred to as being deeper, and a sufficiently deep artificial neural network is referred to as a deep neural network (DNN).

In this structure of the multilayer perceptron, nodes present in the input layer 110 do not use a parameter and an activation function, whereas nodes present in the hidden layer 120 and the output layer 130 use the parameter and the activation function. Here, the parameter is a value that is automatically changed through a learning process and may include a weight and a bias. The weight is a parameter that adjusts the influence of an input signal on a resulting output, and the bias is a parameter that adjusts how easily a node (or neuron) is activated. The activation function refers to a function of receiving, appropriately processing, and outputting a signal. The activation function may include a sigmoid function, a rectified linear unit (ReLU) function, a softmax function, an identity function, and the like but is not necessarily limited thereto.

The multilayer perceptron 100 has a fully-connected structure in which nodes (i.e., neurons) in the respective layers are two-dimensionally connected. The fully-connected structure is a structure in which no connection relationship exists between nodes located in the same layer and a connection relationship exists only between nodes located in immediately adjacent layers.

A learning operation of the multilayer perceptron 100 is briefly described as follows. First, initial values of a weight and a bias as parameters in each layer are set. Subsequently, for one piece of learning (training) data, a net input function value in each layer is calculated, and an output value (i.e., a result value) of an activation function is finally calculated. Here, the net input function value refers to a value input to an activation function of each node. Next, the weight and the bias in each layer are updated so that the difference between an output value of an activation function of the output layer and an actual value is within an allowable error. Finally, for all learning data, when the difference between an output value of an activation function of the output layer and an actual value is within the allowable error, learning is terminated.

For example, as illustrated in FIG. 1B, a learning process of the multilayer perceptron 100 may be defined as an iterative process of feedforward (FF) and backpropagation (BP). This iterative process may continue until the difference (i.e., an error) between a result value calculated in the output layer 130 and an actual value approaches zero.

A feedforward (FF) process refers to a series of learning processes in which each input is multiplied by a corresponding weight while moving from the input layer 110 to the output layer 130, the sum of weights is calculated as a result and is input to an activation function of each layer, and a result value is finally output from an activation function of the output layer 130.

A backpropagation (BP) process refers to a series of learning processes in which a weight and a bias of each layer are updated in order to reduce errors incurred in the feedforward process while moving from the output layer 130 to the input layer 110. The back propagation (BP) process may employ gradient descent as a method for determining a weight but is not limited thereto.

Gradient descent is an optimization technique for finding the lowest point of a loss function, in which the slope of the loss function is obtained and is continuously and repeatedly moved toward a low slope until reaching the lowest point. Here, the loss function is a function defining the difference (i.e., an error) between a result value calculated in the output layer 130 and an actual value. The loss function may be a mean squared error (MSE) or a cross entropy error (CEE) but is not necessarily limited thereto.

Figure 2B:
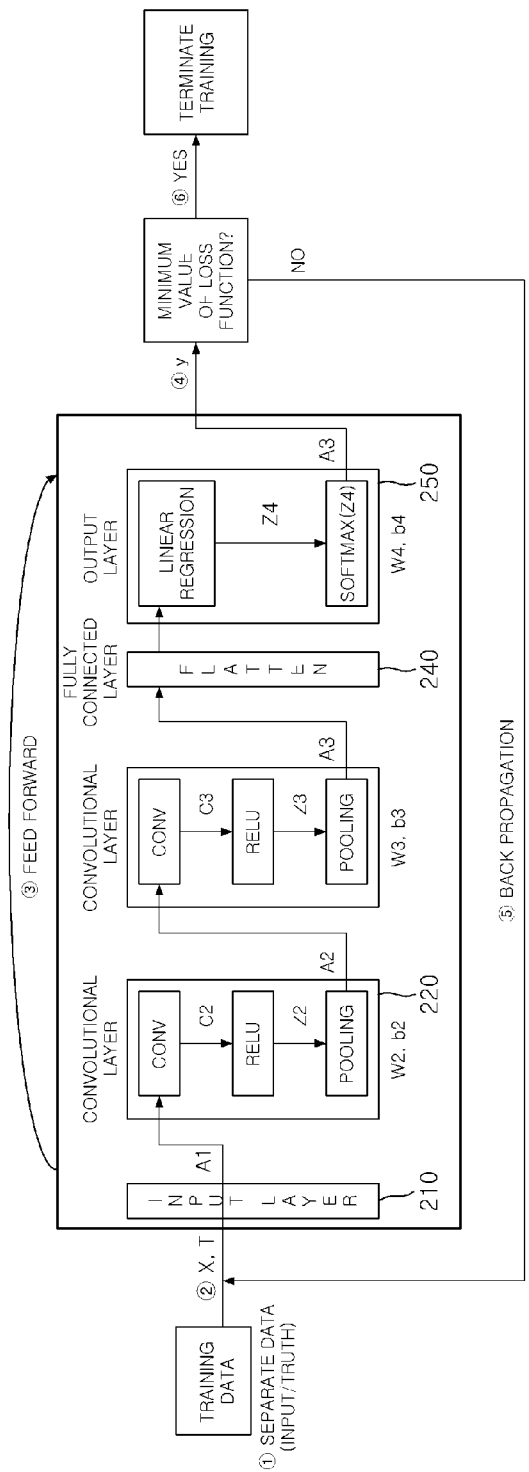
FIG. 2B illustrates a learning process of a convolutional neural network related to the present disclosure.

FIG. 2A illustrates the basic structure of a convolutional neural network (CNN) related to the present disclosure, and FIG. 2B illustrates a learning process of the convolutional neural network illustrated in FIG. 2A.

Referring to FIG. 2A and FIG. 2B, a convolutional neural network (CNN) 200 related to the present disclosure includes an input layer 210, at least one convolutional layer 220, and at least one pooling layer 230, a fully connected layer 240, and an output layer 250. Here, the pooling layer 230 may be included in the convolutional layer 220.

The convolutional neural network 200 includes a part for extracting a feature of input data and a part for classifying input data. Here, a feature extraction part includes the input layer 210, the convolutional layer 220, and the polling layer 230, and a classification part includes the fully connected layer 240 and the output layer 250.

The input layer 210 refers to a layer to which learning data, that is, training data and test data, are input. Generally, learning data used in a convolutional neural network (CNN) may be multidimensional data, such as image data or a matrix.

The convolution layer 220 serves to extract a feature of input data through a convolution operation between the input data and a filter that is an aggregate of weights. The convolution layer 220 includes a filter for extracting a feature of input data and an activation function for converting the value of a convolutional operation between input data and a filter into a nonlinear value. The activation function may be a rectified linear unit (ReLU) function but is not necessarily limited thereto.

The convolution layer 220 may output a plurality of feature maps through a convolution operation between input data and various filters. Subsequently, the convolution layer 220 may output a plurality of activation maps by applying an activation function to the plurality of feature maps.

The pooling layer (or sub-sampling layer) 230 receives output data of the convolution layer 220 as an input and serves to reduce the size of output data (i.e., an activation map) or to emphasize specific data. As a pooling method of the pooling layer 230, there are a max pooling method, an average pooling method, and a min pooling method, among which the max pooling method is most frequently used.

The fully connected layer 240 serves to change a data type of the convolutional neural network (CNN) 200 into a fully connected neural network type. That is, the fully connected layer 240 serves to flatten a 3D output value of the pooling layer 230 into a 1D vector to connect the same to all nodes of the output layer 250 like a general neural network connection.

The output layer 250 serves to output a result value of classifying input data. The output layer 250 may serve to normalize a value input from the fully connected layer 240 into a value ranging from 0 to 1 and to ensure that the sum of output values is always 1. To this end, the output layer 250 may include an activation function, such as a softmax function.

A learning operation of the convolutional neural network 200 having this structure is briefly described as follows. First, initial values of a weight (W) and a bias (B) as parameters in each layer are set. Subsequently, for one piece of learning (training) data, a net input function value in each layer is calculated, and an output value (i.e., a result value) of an activation function is finally calculated. Here, the net input function value refers to a value input to an activation function of each node. Next, the weight and the bias in each layer are updated so that the difference between an output value of an activation function of the output layer and an actual value is within an allowable error. Finally, for all learning data, when the difference between an output value of an activation function of the output layer and an actual value is within the allowable error, learning is terminated.

That is, as illustrated in FIG. 2B, a learning process of the convolutional neural network 200 may be defined as an iterative process of feedforward (FF) and backpropagation (BP). This iterative process may continue until an error in the output layer 250 and an actual value approaches zero.

Figure 4:
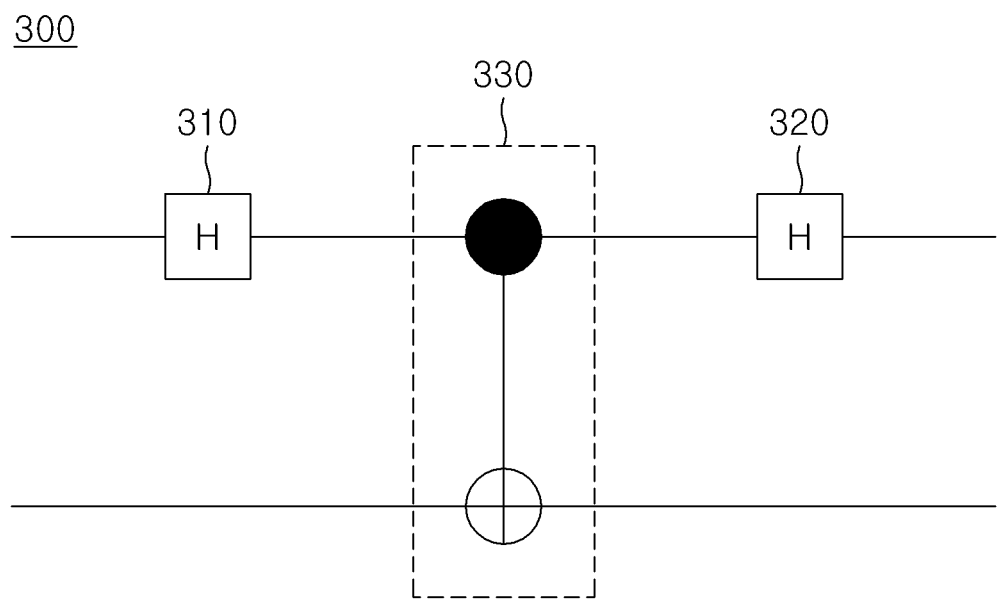
FIG. 4 illustrates an example of a quantum circuit configured using the quantum gates of FIG. 3.

FIG. 3 illustrates types of quantum gates related to the present disclosure, and FIG. 4 illustrates an example of a quantum circuit configured using the quantum gates of FIG. 3.

Referring to FIG. 3 and FIG. 4, a quantum circuit forming a quantum computer includes a plurality of quantum gates. Although a qubit of the quantum computer can have a state of being 0 and 1 at the same time unlike a bit of a conventional computer, the quantum computer needs to be used for an operation or the like and thus needs to have a specific state during an operation. To this end, the quantum computer necessarily requires a quantum gate.

A quantum gate fundamentally implements an operation through matrix multiplication of complex vectors, because a qubit, which is the unit of quantum information of the quantum computer, is expressed as a two-dimensional vector.

Types of quantum gates include a NOT gate, a Hadamard gate, a Pauli XYZ gate, a phase shift gate (S gate and T gate), a CNOT gate, a CZ gate, and a SWAP gate.

The NOT gate is a gate that is equivalent to a NOT gate among logic gates of the conventional computer and changes the state of a qubit being 0 to 1 and the state of a qubit being 1 to 0.

The Hadamard gate is a gate that renders a qubit in a state of 0 or 1 into an overlapping state (0 and 1 existing at the same time). When expressed as a matrix, the Hadamard gate is represented by a determinant illustrated in the drawing.

There are three types of Pauli gates, X, Y, and Z, in total, which means that each qubit rotates about X, Y, and Z axes. When expressed as a matrix, each gate is represented by a determinant illustrated in the drawing.

The phase shift gate is a gate that changes the phase of a qubit. Types of phase shift gates include an S gate and a T gate, each of which is represented by a determinant illustrated in the drawing.

The CNOT gate and the CZ gate are gates used to observe an entanglement state in which one qubit acts on another qubit in a quantum computer. The CNOT gate is a gate that performs a NOT gate operation on a second qubit when a first qubit is 1, and the CZ gate is a gate that performs a Pauli-Z gate operation on a second qubit when a first qubit is 1.

The SWAP gate is a gate that swaps the states of two qubits when there are the two qubits in a quantum computer. When expressed as a matrix, the SWAP gate is represented by a determinant illustrated in the drawing.

Various quantum circuits may be configured by combining a plurality of such quantum gates. For example, as illustrated in FIG. 4, a quantum circuit 300 may be configured by sequentially connecting a first Hadamard gate 310, a CNOT gate 330, and a third Hadamard gate 320.

Figure 5A:
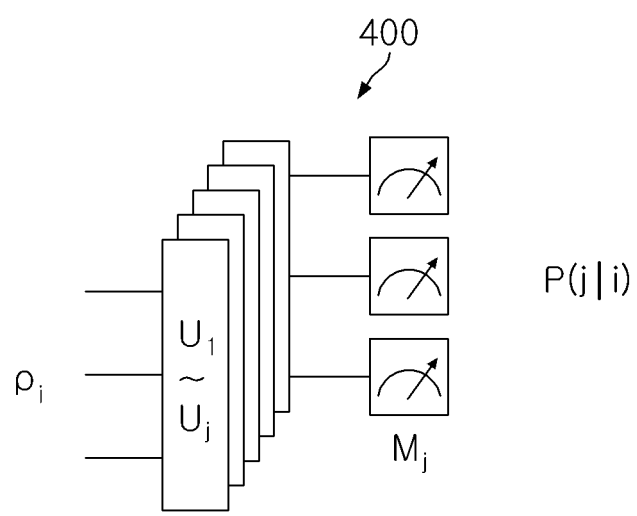
FIGS. 5A and 5B schematically illustrate the structure of a quantum circuit related to the present disclosure.
Figure 5B:
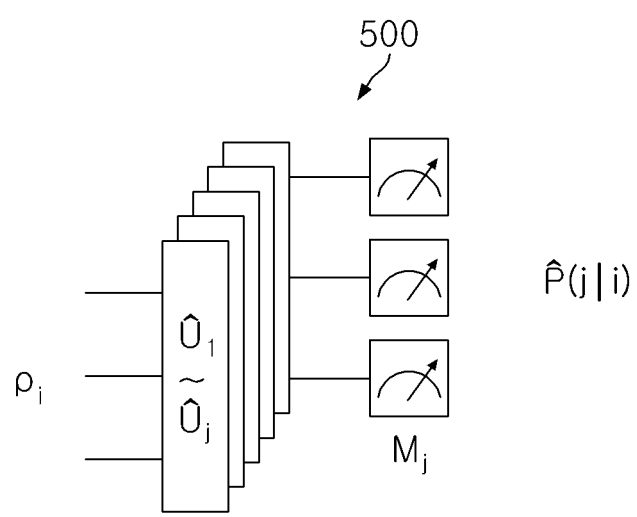

FIGS. 5A and 5B schematically illustrates the structure of a quantum circuit related to the present disclosure. As illustrated in FIGS. 5A and 5B, quantum circuits 400 and 500 related to the present disclosure may include a combination of unitaries $U_1$ to $U_j$ respectively corresponding to one or more quantum gates. Here, an ideal quantum gate (i.e., a quantum gate having no error) may be represented by U, and a practical quantum gate (i.e., a quantum gate having an error) may be represented by $\hat{U}$.

An input state of the quantum circuits 400 and 500 may be defined as a density matrix $\rho_i$, an output state thereof may be defined as j, and a relationship between input and output of the quantum circuits 400 and 500 may be defined as the combination of uniteries corresponding to the quantum gates.

A measurement outcome probability P(j|i) without an error representing the result of measuring output of an ideal quantum circuit 400 may be defined by Equation 1.

$$P(j|i)=Tr(M_j U \rho_i U^\dagger) \qquad \text{[Equation 1]}$$

Here, $\rho_i$ is the input state of the quantum circuit, U is an ideal unitary transformation, and $M_j$ is a measurement operator.

A measurement outcome probability $\hat{P}(j|i)$ without an error representing the result of measuring output of a practical quantum circuit 500 may be defined by Equation 2.

$$\hat{P}(j|i)=Tr(M_j \Lambda(\rho_i)) \qquad \text{[Equation 2]}$$

Here, $\rho_i$ is the input state of the quantum circuit, $\Lambda$ is a practical quantum process, and $M_j$ is a measurement operator.

An error existing in the practical quantum circuit 500 may be quantified on the basis of the first measurement outcome probability $\hat{P}(j|i)$ of the practical quantum circuit 500 and the second measurement outcome probability P(j|i) of the ideal quantum circuit 400. That is, an error value E(j|i) of the quantum circuit may be calculated by Equation 3.

$$E(j|i)=\hat{P}(j|i)-P(j|i) \qquad \text{[Equation 3]}$$

Since a unique error exists in each quantum gate, a quantum circuit including a plurality of quantum gates includes errors accumulated in the individual quantum gates. The errors existing in the quantum circuit depend not only on a configuration of the quantum gates but also on a combination order of the quantum gates. Therefore, it is necessary to correct the errors existing in the quantum circuit in view of the configuration and combination order of the quantum gates. Hereinafter, in the present specification, a method for effectively correcting an error existing in a quantum circuit using a pre-trained deep learning model is described in detail.

FIG. 6 is a flowchart illustrating a quantum circuit error correction method according to an exemplary embodiment of the present disclosure.

Referring to FIG. 6, a quantum circuit error correction apparatus according to an exemplary embodiment of the present disclosure may be installed in a quantum computer and may perform an operation of correcting an error in quantum circuits forming the quantum computer.

Specifically, the quantum circuit error correction apparatus may identify whether a command to request error correction of the quantum circuits forming the quantum computer is received from a user or the like (S610).

As a result of operation 610, when the command to request the error correction of the quantum circuits is received from the user or the like, the quantum circuit error correction apparatus may detect a quantum circuit that is a target of error correction (hereinafter, referred to as a "quantum circuit to be corrected") (S620). Here, the quantum circuit to be corrected may be at least one of a plurality of quantum circuits forming the quantum computer. According to an embodiment, operation 610 may be omitted.

The quantum circuit error correction apparatus may invoke a pre-trained deep learning model (S630). Here, the deep learning model may be a DNN model or a hybrid CNN mode but is not necessarily limited thereto.

The quantum circuit error correction apparatus may detect input data of the deep learning model corresponding to the quantum circuit to be corrected. The input data may include information about the number of 1-qubit gates forming the quantum circuit, information about the number of 2-qubit gates forming the quantum circuit, error information about the quantum circuit, measurement outcome probability information about the quantum circuit, and the like.

The quantum circuit error correction apparatus may infer an error correction value (or error correction matrix C(j|i) for mitigating an error existing in the quantum circuit on the basis of the pre-trained deep learning model (S640). That is, the quantum circuit error correction apparatus may input the detected input data to the pre-trained deep learning model, thereby inferring the error correction value C(j|i) for mitigating the error existing in the quantum circuit.

The quantum circuit error correction apparatus may correct the error existing in the quantum circuit using the error correction value C(j|i) inferred through the deep learning model (S650). That is, the quantum circuit error correction apparatus may subtract the error correction value C(j|i) from the result $\tilde{P}(j|i)$ of measuring practical output of the quantum circuit, thereby correcting the error existing in the quantum circuit.

As described above, the quantum circuit error correction method according to the exemplary embodiment of the present disclosure may conveniently correct the error existing in the quantum circuit using the pre-trained deep learning model, thereby not needing to add separate quantum gates for correcting an error in a quantum error and saving time and energy required to correct the error existing in the quantum circuit due to a simple operational process for correcting the error in the quantum circuit. The deep-learning model may be a DNN model or a hybrid CNN (H-CNN) model. First, a method for correcting an error in a quantum circuit using a DNN model is described in detail.

Figure 7:
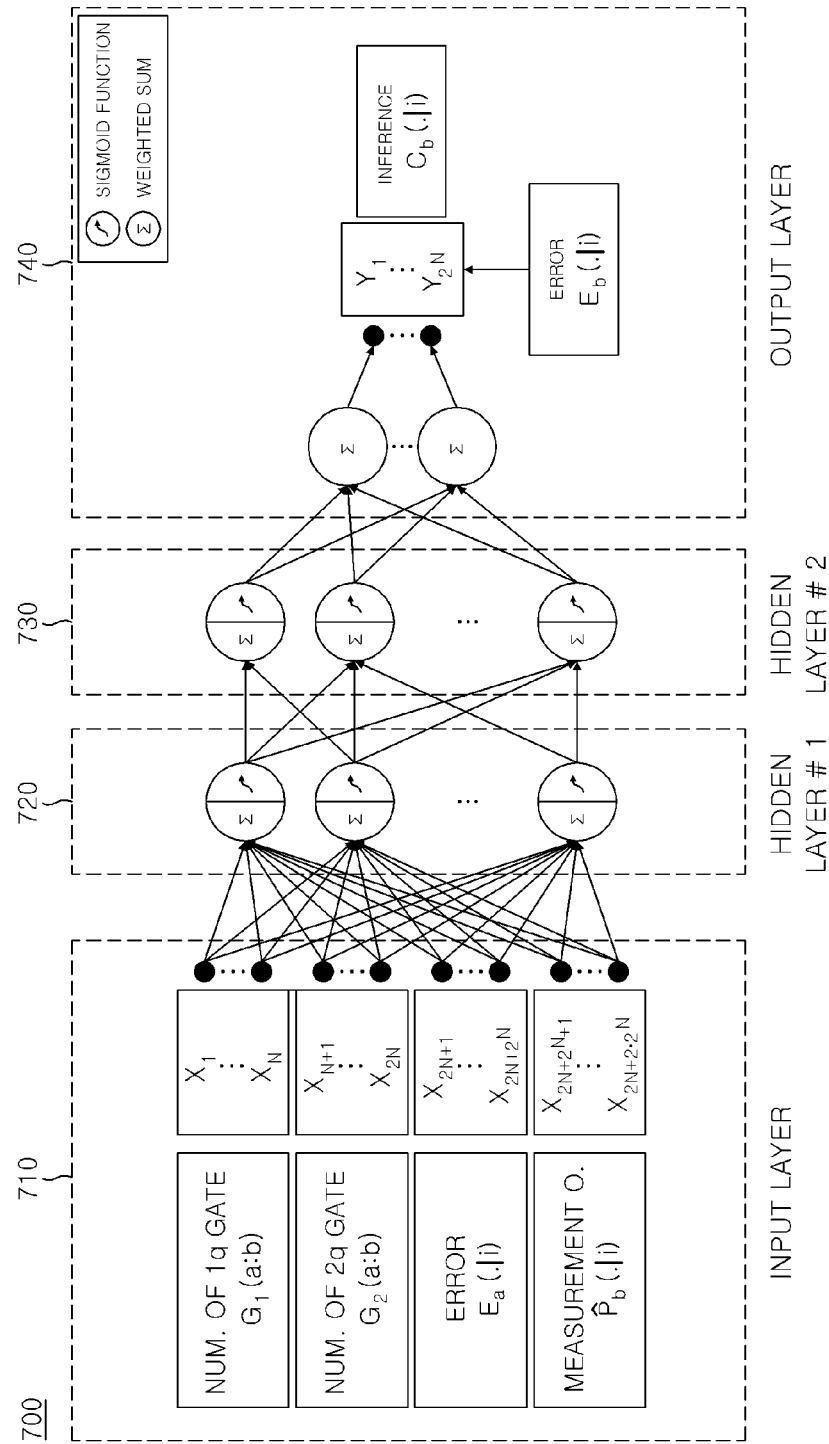
FIG. 7 illustrates the structure of a DNN model according to an exemplary embodiment of the present disclosure.

FIG. 7 illustrates the structure of a DNN model according to an exemplary embodiment of the present disclosure.

Referring to FIG. 7, a DNN model 700 according to an exemplary embodiment of the present disclosure is a learning model for correcting an error in a quantum circuit of an N-qubit system and may include one input layer 710, two hidden layers 720 and 730, and one output layer 740.

Data input to a plurality of nodes present in the input layer 710 of the DNN model 700 may include information $G_1(a:b)$ about the number of 1-qubit gates forming a quantum circuit, information $G_2(a:b)$ about the number of 2-qubit gates forming the quantum circuit, error information $E_a(\cdot|i)$ about the quantum circuit, and measurement outcome probability information $\hat{P}_b(\cdot|i)$ about the quantum circuit. Here, a and b denote a depth of the quantum circuit. Therefore, $G_1(a:b)$ denotes the number of 1-qubit gates of quantum gates disposed between a depth of the quantum circuit of a and a depth of the quantum circuit of b, and $G_2(a:b)$ denotes the number of 2-qubit gates of quantum gates disposed between a depth of the quantum circuit of a and a depth of the quantum circuit of b.

Figure 9:
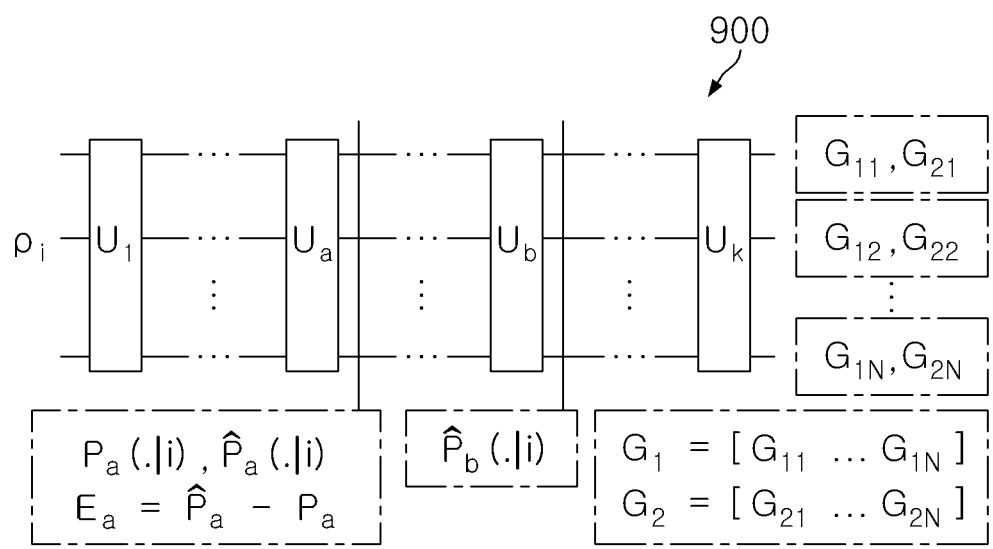
FIG. 9 illustrates data input to an input layer of a DNN model.

For example, as illustrated in FIG. 9, a quantum circuit 900 that is a target to be learned or corrected by the DNN model 700 may be expressed as a combination of a plurality of unitaries $U_1$ to $U_K$ corresponding to a plurality of quantum gates. In this structure of the quantum circuit, the information $G_1$ about the number of 1-qubit gates input to the input layer 710 of the DNN model 700 may be expressed as $[G_{11} \ldots G_{1N}]$, and the information $G_2$ about the number of 2-qubit gates may be expressed as $[G_{21} \ldots G_{2N}]$. The error information $E_a(\cdot|i)$, about the quantum circuit input to the input layer 710 of the DNN model 700 may be defined as an error of a unitary $U_a$ positioned at a depth of the quantum circuit of a, and the measurement outcome probability information $\hat{P}_b(\cdot|i)$ about the quantum circuit may be defined as a measurement outcome probability of a unitary $U_b$ positioned at a depth of the quantum circuit of b.

The input layer 710 of the DNN model 700 may include a total of $2N+2^{N+1}(=N+N+2^N+2^N)$ nodes. Here, N nodes are nodes for inputting the number of 1-qubit gates, N nodes are nodes for inputting the number of 2-qubit gates, $2^N$ nodes are nodes for inputting an error E of the quantum circuit, and $2^N$ nodes are nodes for inputting a measurement outcome probability $\hat{P}_b(\cdot|i))$ of the quantum circuit.

Data output through a plurality of nodes present in the output layer 740 of the DNN model 700 may include an error correction value $C(j|i)$ for reducing (or mitigating) an error existing in the quantum circuit. The output layer 740 may include $2^N$ nodes.

Data input through the plurality of nodes present in the output layer 740 of the DNN model 700 may include the error information $E_a(\cdot|i)$ about the quantum circuit. The error information $E_a(\cdot|i)$ may be defined as an error of a unitary $U_b$ positioned at a depth of the quantum circuit of b. The error information $E_a(\cdot|i)$ ay be used to calculate a loss function in a learning process of the model 700.

Pieces of data input to the DNN model 700 may be set as independent variables of the model, and data output from the DNN model 700 may be set as a dependent variable of the model.

A parameter used for nodes present in the hidden layers 720 and 730 of the DNN model 700 may include a weight and a bias. Further, an activation function used for the nodes present in the hidden layers 720 and 730 of the DNN model 700 may be a sigmoid function but is not necessarily limited thereto. Therefore, instead of the sigmoid function, a ReLU function, a softmax function, or an identity function may be used depending on embodiments.

The loss function $E_{RMS}$ of the DNN model 700 may be defined by Equation 4.

$$E_{RMS} = \sqrt{\frac{\sum_{j=1}^{m}\sum_{k=1}^{l}E_f(j|i)^2}{lm}} \qquad \text{[Equation 4]}$$

Here, $E_f(j|i)$ is a value of the actual error value $E(j|i)$ of the quantum circuit minus the error correction value (i.e., an error estimate) $C(j|i)$, which refers to the final error value of the quantum circuit and may be defined by Equation 5.

$$E_f(j|i)=E(j|i)-C(j|i) \qquad \text{[Equation 5]}$$

The DNN model 700 is subjected to a learning process of updating weights and biases of the nodes present in the hidden layers 720 and 730 using an optimization technique for finding the lowest point of the loss function. The optimization technique may be representatively a gradient descent method but is not necessarily limited thereto.

That is, the DNN model 700 is intended to find an error correction value that minimizes the loss function. Accordingly, a target function F of the DNN model 700 may be defined by Equation 6.

$$F=\mathrm{argmin}_{C(j|i)}E_{RMS} \qquad \text{[Equation 6]}$$

The DNN model 700 is shown to include the two hidden layers 720 and 730 in this embodiment but is not necessarily limited thereto. It will be apparent to those skilled in the art that less than two or more than two hidden layers may be included.

Figure 8:
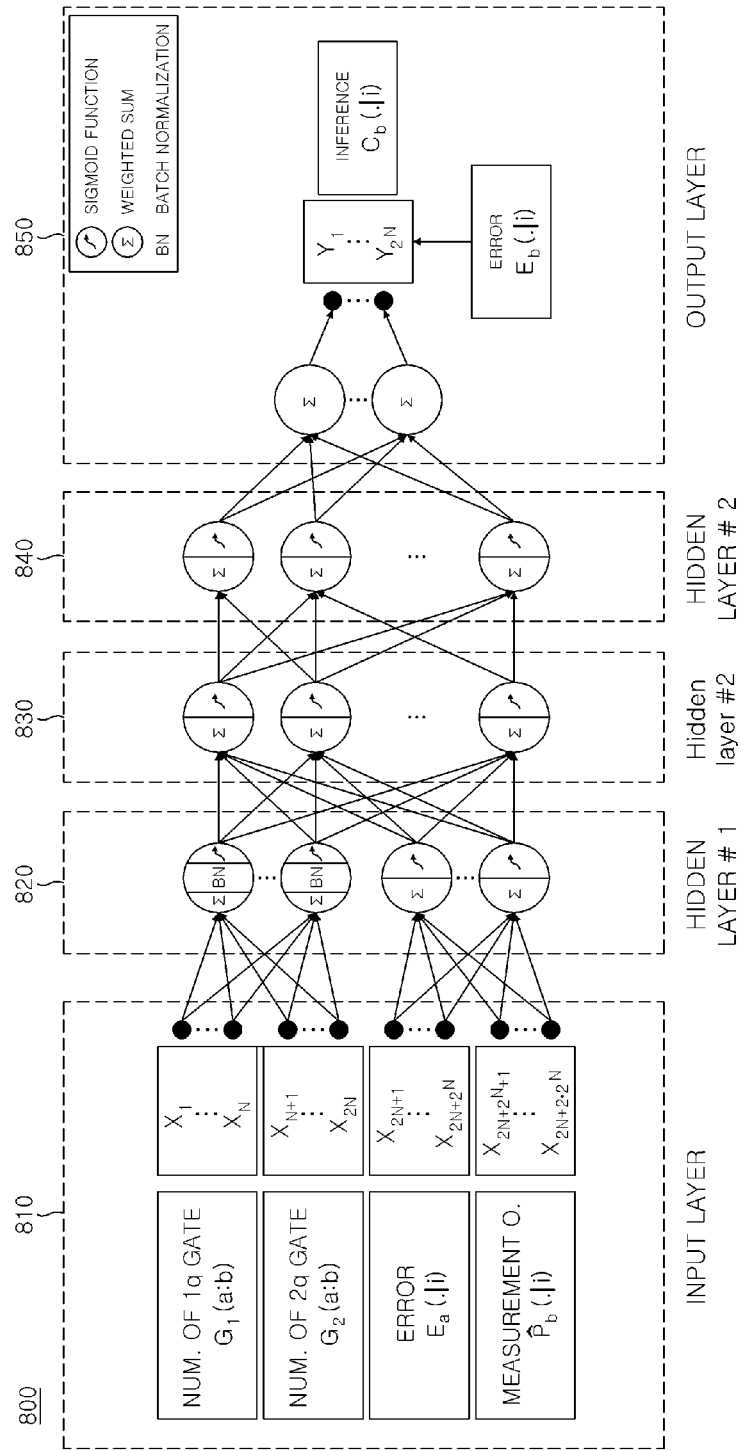
FIG. 8 illustrates the structure of a DNN model according to another exemplary embodiment of the present disclosure.

FIG. 8 illustrates the structure of a DNN model according to another exemplary embodiment of the present disclosure.

Referring to FIG. 8, a DNN model 800 according to another exemplary embodiment of the present disclosure is a learning model for correcting an error in a quantum circuit of an N-qubit system and may include one input layer 810, three hidden layers 820, 830, and 840, and one output layer 850.

Unlike the DNN model 700 illustrated in FIG. 7, the DNN model 800 according to the present disclosure may include one more hidden layer 820. That is, the DNN model 800 may further include the hidden layer 820 that performs batch normalization (BN) only on nodes connected to specific input data. Here, the batch normalization (BN) refers to normalization performed using a mean and a variance for each batch even through data for each batch has various distributions in a learning process.

Among data input to the input layer 810 of the DNN model 800, the number of gates of the quantum circuit has an integer value, while an error value $E_a(\cdot|i)$ and a measurement outcome probability $\hat{P}_b(\cdot|i)$ of the quantum circuit have a value ranging from 0 to 1. Accordingly, batch normalization may be performed on nodes of a first hidden layer 820 connected to pieces of data $G_1(a:b)$ and $G_2(a:b)$ having an integer value, thereby uniformizing the distribution of input data of a second hidden layer 830 connected to the first hidden layer 820 to a value ranging from 0 to 1.

Machine learning may be performed on the DNN models 700 and 800 having the above structures. Specifically, a quantum circuit to be learned belonging to a predetermined training set may be selected, and quantum gates forming the selected quantum circuit to be learned may be analyzed, thereby detecting data to be input to a DNN model. Here, the data to be input to the DNN model may include information $G_1(a:b)$ about the number of 1-qubit gates of the quantum circuit to be learned, information $G_2(a:b)$ about the number of 2-qubit gates ($G_2(a:b)$), error information $E_a(\cdot|i)$, and measurement outcome probability information $\hat{P}_b(\cdot|i)$.

When the input data is completely detected, the detected input data may be input to the DNN model to train the DNN model. Here, the DNN model may be repeatedly trained while sequentially changing variables a, b, and i of the detected input data.

When learning of the quantum circuit is completed, other quantum circuits belonging to the predetermined training set may be sequentially selected, and the same learning process may be performed thereon. This learning process may be repeatedly performed on all quantum circuits included in the training set.

FIG. 10 illustrates a process of selecting a quantum circuit to be learned and training a DNN model on the basis of the selected quantum circuit to be learned. As illustrated in FIG. 10, quantum circuits to be learned may be selected, and a DNN model for correcting (mitigating) an error in a quantum circuit may be trained on the basis of the selected quantum circuits to be learned. Here, the quantum circuits to be learned may be quantum circuits including a predetermined first number of quantum gates or less. For example, the quantum circuits to be learned may be quantum circuits including 10 or less quantum gates.

FIG. 11 illustrates the type of a quantum circuit to be corrected and a process of correcting an error in the quantum circuit to be corrected using a pre-trained DNN model. As illustrated in FIG. 11, a quantum circuit to be corrected (or a quantum circuit to be estimated) may be selected, the selected quantum circuit may be input to a pre-trained DNN model, thereby inferring an error correction value of the quantum circuit, and an error in the quantum circuit may be corrected on the basis of the inferred error correction value.

Quantum circuits to be corrected may include quantum circuits $U_1$ to $U_k$ having the same quantum gate configuration as the quantum gate configuration of quantum circuits to be learned, quantum circuits $U_1$ to $U_{k+1}$ having a configuration of a larger number of quantum gates than in the quantum gate configuration of the quantum circuits to be learned, and quantum circuits $V_1$ to $V_j$ having a quantum gate configuration different from the quantum gate configuration of the quantum circuits to be learned. Here, the quantum circuits to be corrected may be quantum circuits including a predetermined second number of quantum gates or less. For example, the quantum circuits to be corrected may be quantum circuits including 20 or less quantum gates.

As described above, according to the present disclosure, a DNN model is trained on the basis of quantum circuits with a quantum gate configuration having a relatively short depth, and the pre-trained DNN model is applied to quantum circuits with a quantum gate configuration having a relatively long depth, thereby correcting an error in the quantum circuits.

The foregoing quantum circuit error correction method entails a rather complicated operation process for training a DNN model because a large number of pieces of data are input to the DNN model. This problem can be solved through a quantum circuit error correction method using a hybrid CNN model. Hereinafter, a method of correcting an error in a quantum circuit using a hybrid CNN model is described in detail.

Figure 12A:
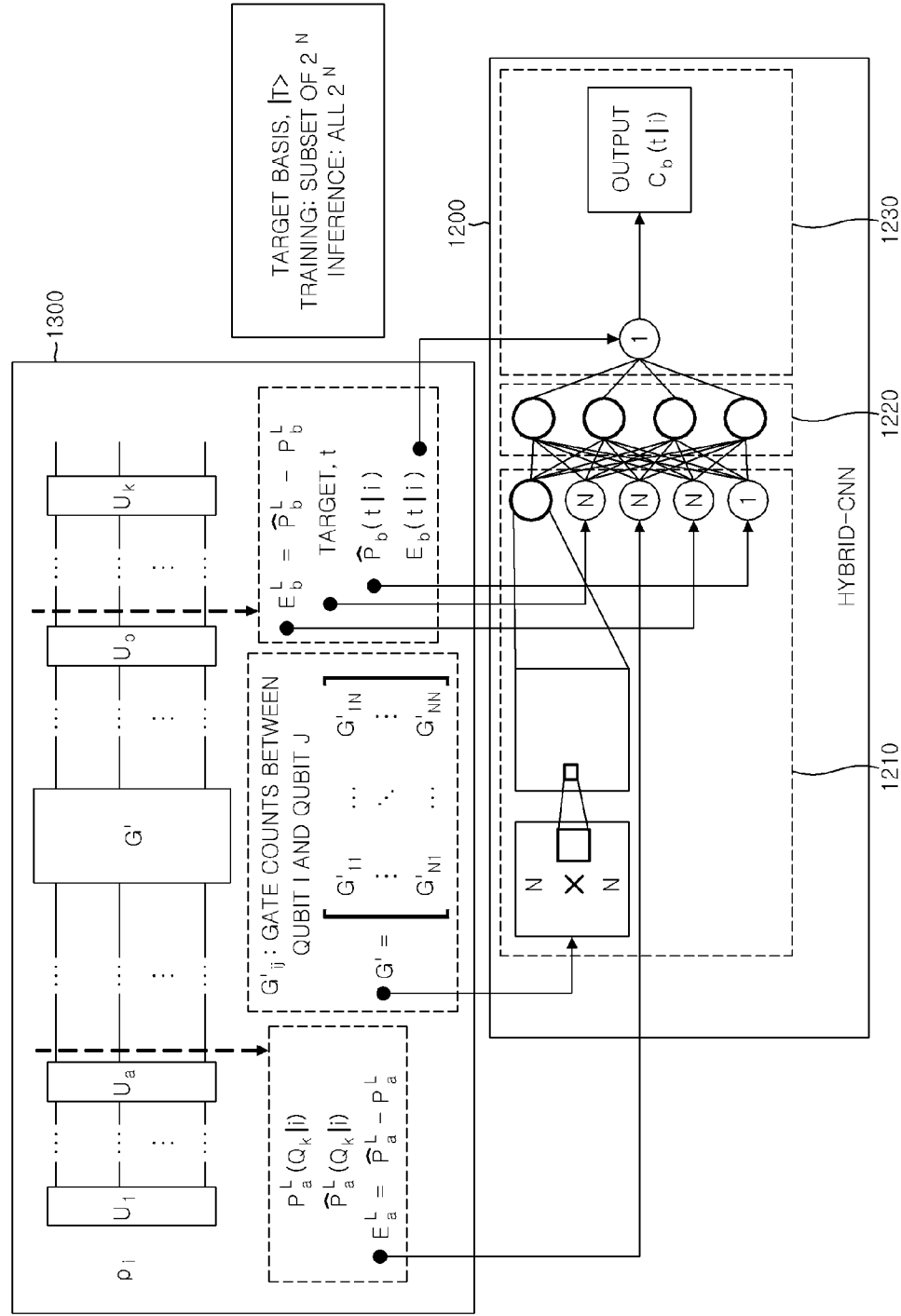
FIG. 12A and FIG. 12B illustrate the structure of an H-CNN model and learning data input to an input layer and an output layer of the model according to an exemplary embodiment of the present disclosure.
Figure 12B:
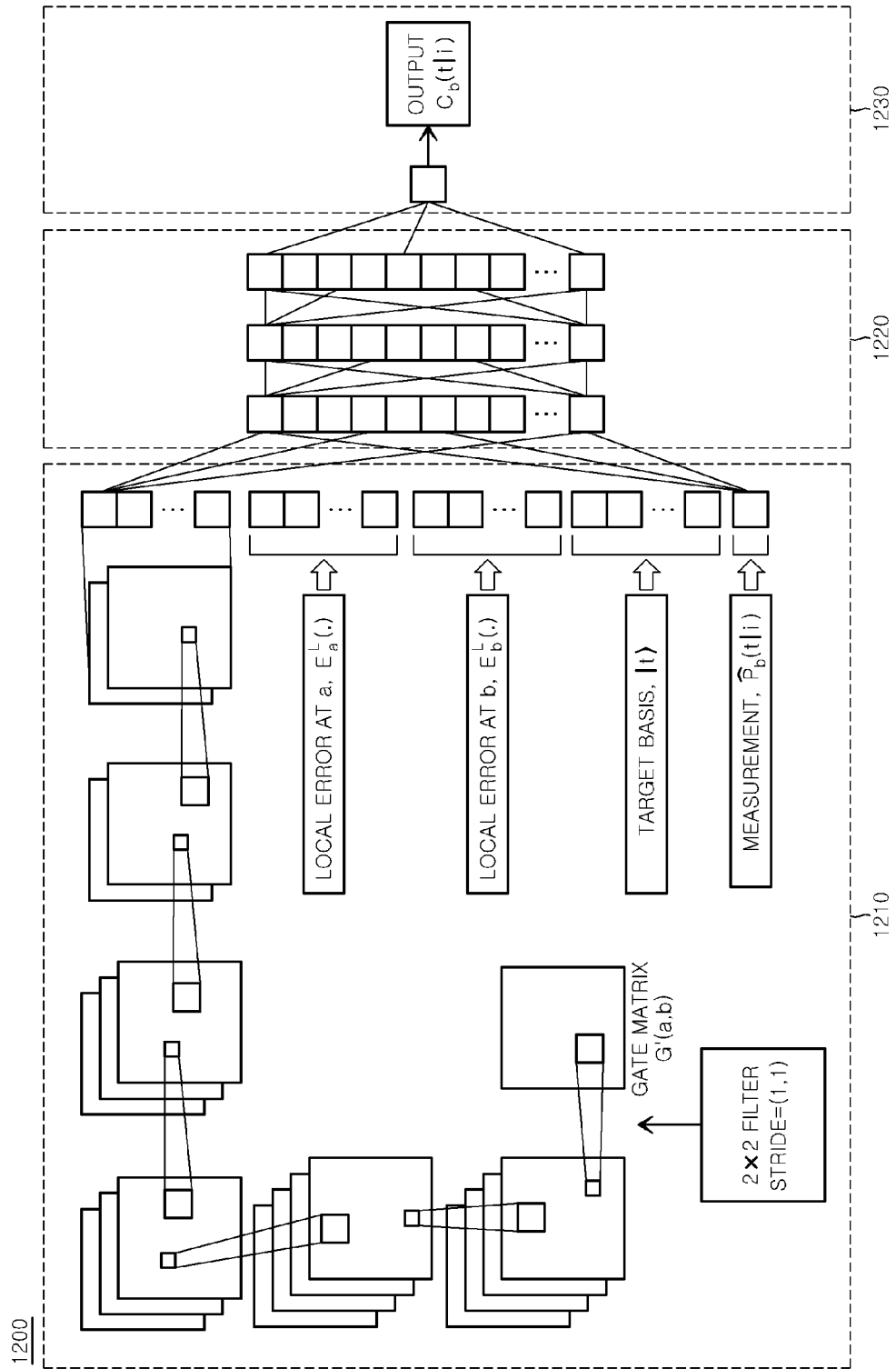

FIG. 12A and FIG. 12B illustrate the structure of a hybrid CNN model and learning data input to an input layer and an output layer of the model according to an exemplary embodiment of the present disclosure.

Referring to FIG. 12A and FIG. 12B, a hybrid CNN model 1200 according to an exemplary embodiment of the present disclosure is a learning model in which a deep neural network (DNN) algorithm is combined with a convolutional neural network (CNN) algorithm to improve performance of quantum circuit error correction. The H-CNN model 1200 is a learning model for correcting an error in a quantum circuit of an N-qubit system and may include an input layer 1210, at least one hidden layer 1220, and an output layer 1230. Here, the input layer 1230 may include at least one convolutional layer, a pooling layer, and a fully connected layer for preprocessing some of input data.

Data input to a plurality of nodes present in the input layer 1210 of the H-CNN model 1200 may include gate matrix information $G'_{ij}$ indicating the number of gates between qubit i and qubit j of a quantum circuit, first local error information $E_a^L$ about the quantum circuit, second local error information $E_b^L$ about the quantum circuit, target state information t about the quantum circuit, and target measurement outcome probability information $\hat{P}_b(t|i)$ about the quantum circuit. Here, a and b represent a depth of the quantum circuit.

For example, as illustrated in FIG. 12A, the quantum circuit 1300 that is a target to be learned or corrected by the H-CNN model 1200 may be expressed as a combination of a plurality of unitaries $U_1$ to $U_K$ corresponding to a plurality of quantum gates. In this structure of the quantum circuit, the first local error information $E_a^L$ about the quantum circuit input to the input layer 1210 of the H-CNN model 1200 may be defined as a local error of a unitary $U_a$ positioned at an a-th depth, and the second local error information $E_b^L$ about the quantum circuit may be defined as a local error of a unitary $U_b$ positioned at a b-th depth. The target state information t about the quantum circuit may be defined as bit information indicating any one of $2^N$ qubit states, and the target measurement outcome probability information $\hat{P}_b(t|i)$ about the quantum circuit may be defined as a measurement outcome probability of a target qubit state of the unitary $U_b$ positioned at the b-th depth.

A gate matrix $G'_{i,j}$ input to the input layer 1210 of the H-CNN model 1200 is a matrix indicating the number of gates existing between qubit i and qubit j of the quantum circuit and may be defined as an N*N matrix. Here, the gate matrix $G'_{i,j}$ may be preprocessed through the at least one convolutional layer, the pooling layer, and the fully connected layer and may then input to the input layer 1210. For example, as illustrated in FIG. 12B, the convolution layer may generate a plurality of feature maps through a convolution operation of input data (i.e., $G'_{i,j}$) and at least one filter and may generate a plurality of activation maps by applying an activation function to the feature maps are. Subsequently, the pooling layer may receive output data of the convolution layer as input and may reduce the size of the output data (i.e., the activation maps) or may emphasize specific data. The fully connected layer may change a data type of a corresponding CNN algorithm into a fully connected neural network type. Output data of the fully connected layer may be input to the input layer 1210. That is, the H-CNN model 1200 may extract a feature of the gate matrix $G'_{i,j}$ using the CNN algorithm and may then input the feature to the input layer 1210.

The input layer 1210 of the H-CNN model 1200 may include the plurality of nodes. Here, N nodes are nodes for inputting the first local error information $E_a^L$ about the quantum circuit, N nodes are nodes for inputting the second local error information $E_b^L$ about the quantum circuit, and N nodes are nodes for inputting the target state information t about the quantum circuit, and one node is a node for inputting the target measurement outcome probability information $\hat{P}_b(t|i)$ about the quantum circuit.

The H-CNN model 1200 may input error information (e.g., $E_a^L$) about the quantum circuit to the input layer 1210 in local units. That is, the H-CNN model 1200 may input the error information about the quantum circuit in qubit units. Accordingly, unlike the foregoing DNN model 700, the H-CNN model 1200 may input only N pieces of data to the learning model, thereby simplifying the operation process of the learning model.

Data output through a node present in the output layer 1240 of the H-CNN model 1200 may include an error correction value C(j|i) for reducing (or mitigating) an error existing in the quantum circuit. The output layer 1240 may include one node.

Data input to the node present in the output layer 1240 of the H-CNN model 1200 may include target error information $E_b(t|i)$ about the quantum circuit. Here, the target error information $E_b(t|i)$ may be defined as an error of a target qubit state of the unitary $U_b$ positioned at the b-th depth of the quantum circuit. The target error information $E_b(t|i)$ may be used to calculate a loss function in a learning process of the model.

Pieces of data input to the H-CNN model 1200 may be set as independent variables of the model, and data output from the H-CNN model 1200 may be set as a dependent variable of the model.

A parameter used for nodes present in the hidden layer 1220 of the H-CNN model 1200 may include a weight and a bias. Further, an activation function used for the nodes present in the hidden layer 1220 of the H-CNN model 1200 may be a sigmoid function but is not necessarily limited thereto.

The loss function $E_{RMS}$ of the H-CNN model 1200 may be defined by Equation 7.

$$E_{RMS} = \sqrt{\frac{\sum_{k=1}^{i} E_C(t|i)^2}{m}} \qquad \text{[Equation 7]}$$

Here, $E_C(t|i)$ is a value of the actual error value E(t|i) of the quantum circuit minus the error correction value C(t|i), which refers to the final error value of the quantum circuit and may be defined by Equation 8.

$$E_C(k|i) = E(k|i) - C(k|i) \qquad \text{[Equation 8]}$$

The H-CNN model 1200 is subjected to a learning process of updating weights and biases of the nodes present in the hidden layer 1220 using an optimization technique for finding the lowest point of the loss function. The optimization technique may be representatively a gradient descent method but is not necessarily limited thereto.

FIG. 13 illustrates a process of selecting a quantum circuit to be learned and training an H-CNN model on the basis of the selected quantum circuit to be learned. As illustrated in FIG. 13, quantum circuits to be learned may be selected, and an H-CNN model for correcting (mitigating) an error in a quantum circuit may be trained on the basis of the selected quantum circuits to be learned. Here, the quantum circuits to be learned may be quantum circuits including a predetermined number of quantum gates or less. For example, the quantum circuits to be learned may be quantum circuits including 10 or less quantum gates.

FIG. 14 illustrates the type of a quantum circuit to be corrected and a process of correcting an error in the quantum circuit to be corrected using a pre-trained H-CNN model. As illustrated in FIG. 14, a quantum circuit to be corrected (or a quantum circuit to be inferred) may be selected, the selected quantum circuit may be input to a pre-trained H-CNN model, thereby inferring an error correction value of the quantum circuit, and an error in the quantum circuit may be corrected on the basis of the inferred error correction value.

Quantum circuits to be corrected may include quantum circuits $U_1$ to $U_k$ having the same quantum gate configuration as the quantum gate configuration of quantum circuits to be learned, quantum circuits $U_1$ to $U_k+1$ having a configuration of a larger number of quantum gates than in the quantum gate configuration of the quantum circuits to be learned, and quantum circuits $V_1$ to $V_j$ having a quantum gate configuration different from the quantum gate configuration of the quantum circuits to be learned. Here, the quantum circuits to be corrected may be quantum circuits including a predetermined number of quantum gates or less. For example, the quantum circuits to be corrected may be quantum circuits including 20 or less quantum gates.

As described above, according to the present disclosure, an H-CNN model is trained on the basis of quantum circuits with a quantum gate configuration having a relatively short depth, and the pre-trained H-CNN model is applied to quantum circuits with a quantum gate configuration having a relatively long depth, thereby correcting an error in the quantum circuits.

Figure 15:
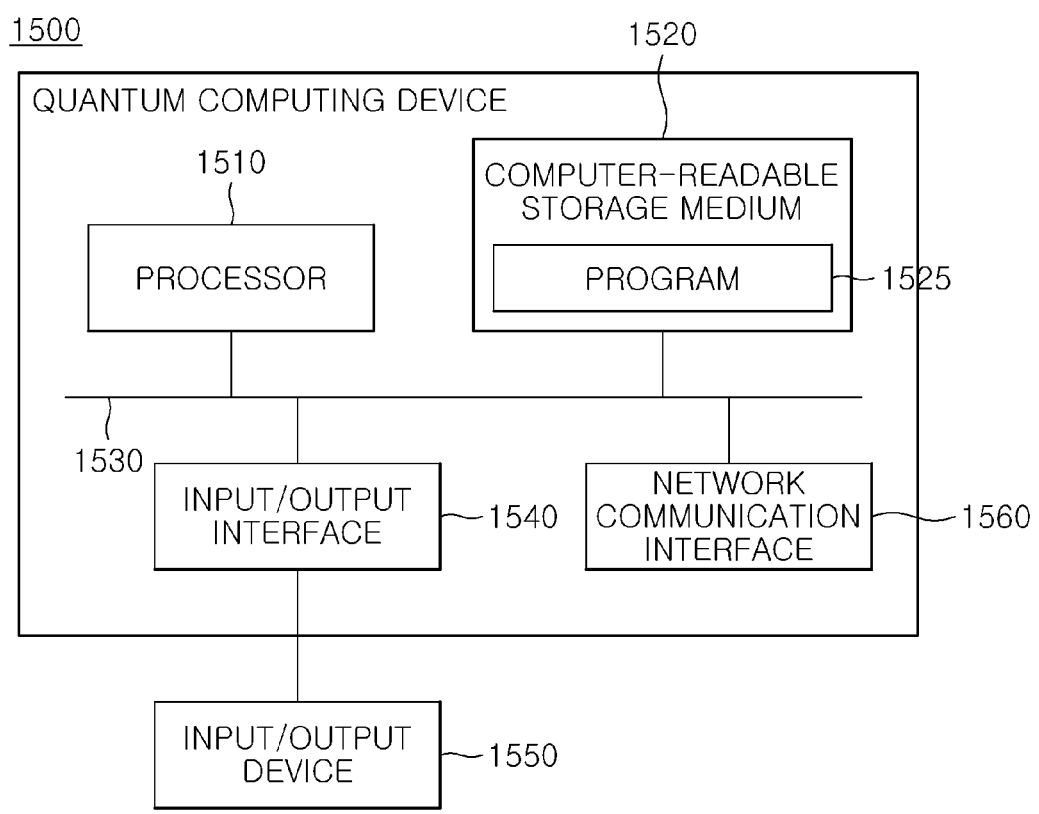
FIG. 15 is a block diagram illustrating the configuration of a quantum computing device according to an exemplary embodiment of the present disclosure.

FIG. 15 is a block diagram illustrating the configuration of a quantum computing device according to an exemplary embodiment of the present disclosure.

Referring to FIG. 15, the quantum computing device 1500 according to the exemplary embodiment of the present disclosure includes at least one processor 1510, a computer-readable storage medium 1520, and a communication bus 1530. The quantum computing device 1500 may be the foregoing quantum circuit error correction apparatus or one or more components included in the quantum circuit error correction apparatus.

The processor 1510 may cause the quantum computing device 1500 to operate according to the foregoing illustrative embodiments. For example, the processor 1510 may execute at least one program 1525 stored in the computer-readable storage medium 1520. The at least one program may include at least one computer-executable instruction, and the computer-executable instruction may be configured to cause the quantum computing device 1500 to perform operations according to the illustrative embodiments when executed by the processor 1510.

The computer-readable storage medium 1520 is configured to store a computer-executable instruction or program code, program data, and/or other suitable types of information. The program 1525 stored in the computer-readable storage medium 1520 includes a set of instructions executable by the processor 1510. In one exemplary embodiment, the computer-readable storage medium 1520 may be a memory (a volatile memory, such as a random access memory, a nonvolatile memory, or a suitable combination thereof), one or more magnetic disk storage devices, optical disk storage devices, flash memory devices, other types of storage media accessed by the quantum computing device 1500 and capable of storing desired information, or a suitable combination thereof.

The communication bus 1530 interconnects various other components of the quantum computing device 1500 including the processor 1510 and the computer-readable storage medium 1520.

The quantum computing device 1500 may also include at least one input/output interface 1540 and at least one network communication interface 1560 that provide an interface for at least one input/output device 1550. The input/output interface 1540 and the network communication interface 1560 are connected to the communication bus 1530.

The input/output device 1550 may be connected to other components of the quantum computing device 1500 through the input/output interface 1540. The illustrative input/output device 1550 may include a pointing device (mouse or trackpad), an input device, such as a keyboard, a touch input device (touchpad or touchscreen), a voice or sound input device, various types of sensor devices and/or an imaging device, and/or an output device, such as a display device, a printer, a speaker and/or a network card. The illustrative input/output device 1550 may be included in the quantum computing device 1500 as a component forming the quantum computing device 1500 or may be connected to the quantum computing device 1500 as a device separate from the quantum computing device 1500.

A quantum circuit error correction method and an apparatus therefor according to exemplary embodiments of the present disclosure may have the following effects. According to at least one of exemplary embodiments of the present disclosure, an error existing in a quantum circuit may be conveniently corrected using a pre-trained deep learning model, thereby not needing to add separate quantum gates for correcting an error in a quantum error and saving time and energy required to correct the error existing in the quantum circuit due to a simple operational process for correcting the error in the quantum circuit. The effects obtainable by a quantum circuit error correction method and an apparatus therefor according to embodiments of the present disclosure are not limited to the effects mentioned above, and other effects not mentioned will be clearly understood by those skilled in the art from the following description.

The present disclosure described above can be realized as a computer-readable code in a medium recording a program. A computer-readable medium includes any type of recording device in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical recording device, and the like. Therefore, the above detailed description should not be construed as restrictive in all aspects and should be considered as illustrative. The scope of the present disclosure should be determined on the basis of reasonable interpretation of the appended claims, and all changes and modifications within the equivalent scope of the present disclosure are included in the scope of the present disclosure.

What is claimed is:

1. A method for mitigating an error of a quantum circuit in a quantum computer, the method comprising:
    detecting a quantum circuit to be mitigated among a plurality of quantum circuits forming the quantum computer;
    invoking a pre-trained deep learning model for mitigating an error of the plurality of quantum circuits;
    inferring an error correction value of the detected quantum circuit using the invoked deep learning model; and
    mitigating an error of the detected quantum circuit based on the inferred error correction value,
    wherein the deep learning model is a deep neural network (DNN) model, and
    wherein an independent variable of the DNN model comprises at least one of information $G_1(a:b)$ about a number of 1-qubit gates of unitaries positioned between depth a and depth b of the quantum circuit, information $G_2(a:b)$ about a number of 2-qubit gates of the unitaries positioned between the depth a and the depth b of the quantum circuit, error information $E_a(\cdot|i)$ about a unitary positioned at the depth a of the quantum circuit, and measurement outcome probability information $\hat{P}_b(\cdot|i)$ about a unitary positioned at the depth b of the quantum circuit.

2. The method of claim 1, further comprising:
    detecting input data of the deep learning model corresponding to the detected quantum circuit.

3. The method of claim 2, wherein the inferring comprises inferring the error correction value by inputting the detected input data to the deep learning model.

4. The method of claim 1, wherein the mitigating comprises mitigating the error existing in the quantum circuit by subtracting the inferred error correction value from a measurement result value of a practical output of the detected quantum circuit.

5. The method of claim 1, wherein each quantum circuit comprises a combination of a plurality of unitaries corresponding to a plurality of quantum gates.

6. The method of claim 1, wherein a dependent variable of the DNN model comprises error correction information $C_b(\cdot|i)$ about the unitary positioned at the depth b of the quantum circuit.

7. The method of claim 6, wherein error information $E_b(\cdot|i)$ about the unitary positioned at the depth b of the quantum circuit is used to calculate a loss function in a training process of the DNN model.

8. A method for mitigating an error of a quantum circuit in a quantum computer, the method comprising:
    detecting a quantum circuit to be mitigated among a plurality of quantum circuits forming the quantum computer;
    invoking a pre-trained deep learning model for mitigating an error of the plurality of quantum circuits;
    inferring an error correction value of the detected quantum circuit using the invoked deep learning model; and
    mitigating an error of the detected quantum circuit based on the inferred error correction value,
    wherein the deep learning model is a hybrid convolutional neural network (H-CNN) model, and
    wherein an independent variable of the H-CNN model comprises at least one of gate matrix information $G'_{ij}$ indicating a number of gates between qubit i and qubit j of the quantum circuit, first local error information $E_a^L$ about a unitary positioned at depth a of the quantum circuit, second local error information $E_b^L$ about a unitary positioned at depth b of the quantum circuit, target state information t about the quantum circuit, and target measurement outcome probability information $\hat{P}_b(t|i)$ about the unitary positioned at the depth b of the quantum circuit.

9. The method of claim 8, wherein, in a training process of the H-CNN model, the gate matrix information $G'_{i,j}$ is preprocessed through at least one convolutional layer, a pooling layer, and a fully connected layer and is input to an input layer of the H-CNN model.

10. The method of claim 8, wherein a dependent variable of the H-CNN model comprises target error information $E_b(t|i)$ about the unitary positioned at the depth b of the quantum circuit.

11. The method of claim 10, wherein the target error information $E_b(t|i)$ about the unitary positioned at the depth b of the quantum circuit is used to calculate a loss function in a training process of the H-CNN model.

12. An apparatus for mitigating an error of a quantum circuit, the apparatus comprising:
 a memory to store a pre-trained deep learning model for mitigating an error of a plurality of quantum circuits forming a quantum computer; and
 a processor to detect a quantum circuit to be mitigated among the plurality of quantum circuits, to infer an error correction value of the detected quantum circuit using the deep learning model stored in the memory, and to mitigate an error of the detected quantum circuit based on the inferred error correction value,
 wherein the deep learning model is a deep neural network (DNN) model, and
 wherein an independent variable of the DNN model comprises at least one of information $G_1(a:b)$ about a number of 1-qubit gates of unitaries positioned between depth a and depth b of the quantum circuit, information $G_2(a:b)$ about a number of 2-qubit gates of the unitaries positioned between the depth a and the depth b of the quantum circuit, error information $E_a(\cdot|i)$ about a unitary positioned at the depth a of the quantum circuit, and measurement outcome probability information $\hat{P}_b(\cdot|i)$ about a unitary positioned at the depth b of the quantum circuit.

13. The apparatus of claim 12, wherein the processor detects input data of the deep learning model corresponding to the detected quantum circuit and infers the error correction value by inputting the detected input data to the deep learning model.

14. The apparatus of claim 12, wherein the processor mitigates the error existing in the quantum circuit by subtracting the inferred error correction value from a measurement result value of a practical output of the detected quantum circuit.

15. The apparatus of claim 12, wherein a dependent variable of the DNN model comprises error correction information $C_b(\cdot|i)$ about the unitary positioned at the depth b of the quantum circuit.

* * * * *